Patented Dec. 12, 1939

2,183,325

UNITED STATES PATENT OFFICE 2,183,325

MANUFACTURE OF UNSATURATED ACIDS

Hanns Peter Staudinger, Ewell, England, assignor to The Distillers Company Limited, Edinburgh, Scotland, a British company No Drawing. Application December 6, 1938, Serial No. 244,289. In Great Britain January 1, 1938

5 Claims. (Cl. 260—530)

The present invention relates to the oxidation of unsaturated aliphatic aldehydes to their corresponding acids and particulary but not exclusively to the production of crotonic acid from crotonaldehyde.

The direct oxidation of unsaturated aldehydes such as crotonaldehyde by means of air or oxygen gives poor yields is effected at ordinary or moderate temperatures owing to production of formic acid, and when the temperature is raised by-products of a resinous or tarry nature are formed.

It is known to effect the conversion of acetaldehyde into acetic acid by the oxidation of a weak solution of the aldehyde in acetic acid, but it is not practicable to carry out the oxidation of crotonaldehyde in crotonic acid since this is a solid at ordinary temperature—moreover the presence of the crotonic acid does not inhibit entirely the tendency to form resinous or tarry by-products when the temperature is raised.

According to the present invention the oxidation of unsaturated aliphatic aldehydes by means of oxygen or a gas containing oxygen is carried out in the presence of a per-compound of an organic acid that is completely miscible with the aldehyde.

If distillation is to be resorted to for the after-treatment to isolate the resultant acid the boiling point of the acid used must be such that it can be separated readily from the resultant acid and must also be distillable without decomposition. Acetic acid has been found to be particularly suitable, but other acids having the aforementioned properties e. g. propionic acid and butyric acid may be employed. The presence of the acetic or other saturated fatty acid also reduces the formation of compounds which act as inhibitors. This latter action is especially pronounced when the crotonaldehyde to be oxidised is not quite dry or has been standing for a prolonged period.

The oxidation should be effected at room temperature or at moderate temperatures for example between 60° C. and 100° C. and preferably below the boiling point of the aldehyde to be oxidised.

Oxidation may be effected under ordinary pressure but increased pressure may be employed if desired. Small amounts of an oxidation catalyst or an oxygen carrier such as manganese acetate, copper acetate, copper crotonate and the like may be added to the reactants. Organic oxygen carriers such as benzoyl peroxide are particularly advantageous.

The amount of acid added to the aldehyde may vary within wide limits and mixtures of 80% or more by volume of crotonaldehyde with 20% or less by volume of acetic acid can be oxidised with good yields. In order to carry out the process, air or oxygen may be blown through a mixture of crotonaldehyde and per acetic acid but an alternative method is to pass the mixture of crotonaldehyde with per acetic acid downwards through a packed column in counter-current to a stream of air.

The resultant crotonic acid can be recovered by filtration or by simple distillation from the acetic acid and any unchanged crotonaldehyde. High yields of pure crotonic acid free from resinous or tarry products are obtained.

In place of crotonaldehyde other unsaturated aldehydes may be oxidised to the corresponding acids e. g. methyl acrolein may be oxidised to methacrylic acid.

The following examples illustrate the manner in which the invention may be carried into effect:

Example 1

A mixture of 100 grams glacial acetic acid and 0.3 gram of benzoyl peroxide was prepared and 250 litres of air was blown through at 20° C. 10 cc. of the resultant per-acid were added to 190 cc. of crude crotonaldehyde and air was passed through this mixture in a finely divided form at 20 litres per hour. During this process the liquid was kept at 20° C. by external cooling. According to the efficiency of the cooling the rate of air has to be adjusted so that the reaction temperature does not exceed 25 to 27° C. After about 24 hours, crystals of crotonic acid separate, indicating that the crotonic acid content in the mixture is above 80 per cent by volume. The crystals of crotonic acid are then separated by filtration. New crotonaldehyde may then be added to the remaining liquid and the process may be continued as before.

As an alternative to filtration, the crotonic acid may be recovered from the reaction mixture by distilling off the remaining crotonaldehyde and finally the acetic acid under reduced pressure. The distillation has however to be conducted with great precaution as a sudden rise of temperature may occur due in part to rapid decomposition of the per-compounds present in the reaction mixture and to other exothermic by-reaction.

Example 2

A mixture of 200 cc. of crotonaldehyde and 25 cc. of acetic acid and 0.03 gram benzoyl peroxide was run down a packed column up which a current of air was passing. The rate of the aldehyde flow was adjusted to 10 cc. per hour and the rate of the air flow was adjusted to 10 litres per hour thereby ensuring that the temperature in the column did not exceed 80° C. The solution of resultant crotonic acid in the acetic acid and some crotonaldehyde, which collected at the base of the column, was distilled under reduced pressure to isolate the crotonic acid.

What I claim is:

1. The method of converting unsaturated aliphatic aldehydes into their corresponding acids by oxidation which consists in subjecting the aldehyde to the action of oxygen in the presence of a per-compound of an organic acid that is completely miscible with the aldehyde.

2. The method according to claim 1, in which the per-compound used for assisting the conversion is per acetic acid.

3. The method according to claim 1 in which the aldehyde employed is crotonaldehyde.

4. The method of converting unsaturated aliphatic aldehydes into their corresponding acids by oxidation which consists in subjecting the aldehyde to the action of a gas containing oxygen in the presence of a per-compound of an organic acid that is completely miscible with the aldehyde.

5. The method of converting crotonaldehyde to crotonic acid by oxidation which comprises subjecting crotonaldehyde to the action of an oxygen-containing gas selected from the class consisting of oxygen and air, in the presence of per-acetic acid.

HANNS PETER STAUDINGER.